United States Patent
Joo

(10) Patent No.: US 9,233,749 B1
(45) Date of Patent: Jan. 12, 2016

(54) VARIABLE CAMBER ADAPTIVE COMPLIANT WING SYSTEM

(71) Applicant: The United States of America, as represented by the Secretary of the Air Force, Washington, DC (US)

(72) Inventor: James J. Joo, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/096,134

(22) Filed: Dec. 4, 2013

(51) Int. Cl.
*B64C 3/48* (2006.01)

(52) U.S. Cl.
CPC ........................................ *B64C 3/48* (2013.01)

(58) Field of Classification Search
CPC .............. B64C 3/14; B64C 3/44; B64C 3/48; B64C 2003/445
USPC .................. 244/219, 211–217, 99.8
See application file for complete search history.

(56) References Cited

U.S. PATENT DOCUMENTS

| | | | | |
|---|---|---|---|---|
| 1,379,921 A | * | 5/1921 | Holle | 244/203 |
| 1,745,677 A | * | 2/1930 | Hopper | 244/219 |
| 2,205,714 A | * | 6/1940 | Doepp | 244/113 |
| 3,076,623 A | * | 2/1963 | Lyon | 244/215 |
| 4,053,124 A | * | 10/1977 | Cole | 244/219 |
| 4,198,019 A | | 4/1980 | Linczmajer | |
| 4,475,702 A | * | 10/1984 | Cole | 244/214 |
| 4,530,301 A | * | 7/1985 | Latham | 114/39.31 |
| 5,509,623 A | * | 4/1996 | Schmittle | 244/48 |
| 5,971,328 A | | 10/1999 | Kota | |
| 6,045,096 A | * | 4/2000 | Rinn et al. | 244/219 |
| 6,089,503 A | * | 7/2000 | Volk | 244/48 |
| 6,276,641 B1 | | 8/2001 | Gruenewald et al. | |
| 6,491,262 B1 | | 12/2002 | Kota | |
| 7,384,016 B2 | * | 6/2008 | Kota et al. | 244/123.1 |
| 8,113,470 B1 | * | 2/2012 | Motosko, III | 244/219 |
| 8,418,966 B2 | | 4/2013 | Hetrick et al. | |
| 2009/0302168 A1 | * | 12/2009 | Hetrick et al. | 244/214 |
| 2010/0090067 A1 | | 4/2010 | Pfaller | |
| 2013/0099049 A1 | | 4/2013 | Reany et al. | |

FOREIGN PATENT DOCUMENTS

WO  2007145718 A3  12/2007

* cited by examiner

*Primary Examiner* — Tien Dinh
*Assistant Examiner* — Christopher Hutchens
(74) *Attorney, Agent, or Firm* — AFMCLO/JAZ; Charles Figer, Jr.

(57) ABSTRACT

A fixed compliant wing system is provided that is coupled to a rigid spar and a rigid stopper. The fixed compliant wing system includes an actuator and at least two compliant rib structures coupled to the rigid spar. The compliant rib structures include an outer compliant contoured structure, a drive member coupled to the outer compliant contoured structure where the drive member is in a sliding arrangement with the rigid stopper. The drive member is further connected to the actuator. The outer compliant contoured structure of the compliant rib structures is configured to deform when force is applied from the actuator to the drive member. The fixed complaint wing system further includes a skin encompassing the compliant rib structures.

6 Claims, 9 Drawing Sheets

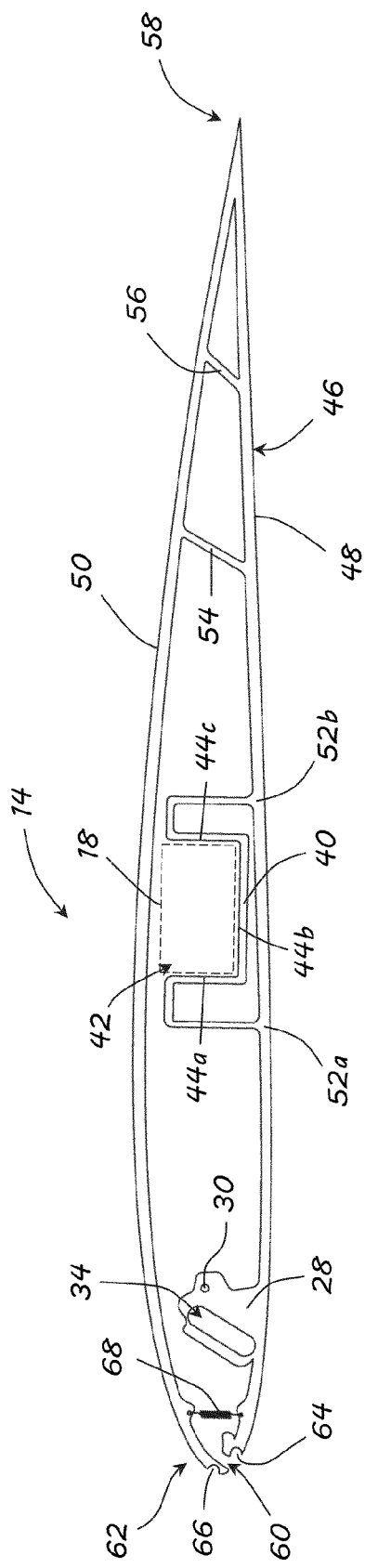
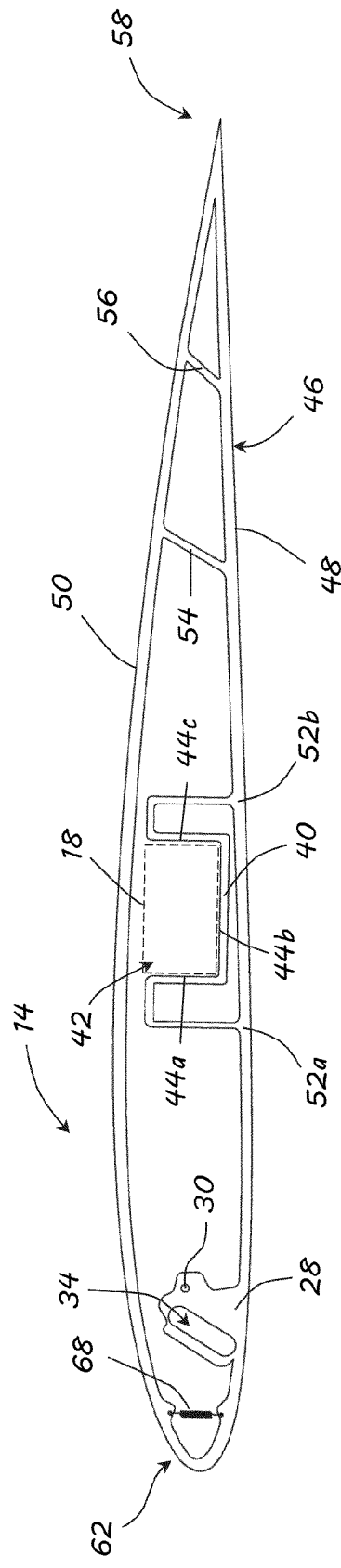
FIG. 6
FIG. 7

VARIABLE CAMBER ADAPTIVE COMPLIANT WING SYSTEM

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention generally relates to systems for producing adjustable surface contours, such as for control surfaces for aircraft, and more particularly, an adaptive, variable camber compliant system.

2. Description of the Related Art

In early aircraft, wing warping was method used for lateral (roll) control of a fixed-wing aircraft. This technique, which was used by the Wright brothers, essentially consisted of a system of pulleys and cables, which were used to twist the trailing edges of the wings in opposite directions. However, because most wing warping designs involved flexing of structural members, they were difficult to control and liable to cause structural failure. As aircraft further developed, wing warping was replaced by rigid wing structures having a number of flight control surfaces, such as ailerons, leading edge slats, and flaps, for example.

Control surfaces such as ailerons are generally used to control roll, where flaps and slats are generally used to raise the lift coefficient of the wing and reduce the stalling speed of an aircraft, which is desirable during take-off and landing events. While these control surfaces are an improvement over the original wing warping control, they also have drawbacks. The control surfaces create drag during use, which can result in unnecessary fuel consumption. Additional, there are inherent gaps created between the control surfaces and the wing structure, which can add to noise production, which may be undesirable during quiet flight.

Thus, there is a need for an arrangement for varying the dimensions and contours of airfoils so as to optimize same for different flight conditions. Thus, for example, the wings configuration that would be optimum for stable, undisturbed flight, would be different from the wing configuration that would be optimized during take-off and landing. It would additionally be advantageous if the contour of the airfoils adjusted in a manner that is not constant through the length of the airfoil, but which varies, illustratively to form a twist along the control surface of the wing. There is also need for optimizing the configuration and contour of such surfaces in other applications, such as in hydrofoils for water craft and spoilers for high speed land vehicles.

SUMMARY OF THE INVENTION

Embodiments of the invention address the needs in the art by providing a fixed compliant wing system. The fixed compliant wing system may be coupled to a rigid spar and a rigid stopper of an aircraft or similar structure on other types of vehicles. The fixed compliant wing system includes an actuator coupled to the rigid spar and at least two compliant rib structures coupled to the rigid spar. The compliant rib structures, in some embodiments include an outer compliant contoured structure and a drive member coupled to the outer compliant contoured structure. The drive member, in some embodiments, may be in a sliding arrangement with the rigid stopper. The drive member may also be further connected to the actuator. The outer compliant contoured structure is configured to deform when force is applied to the drive members of the compliant rib structures. Additionally, a skin encompasses the compliant rib structures.

In some embodiments, the fixed compliant wing system may also include a rigid support member coupled to the rigid spar. In these embodiments, the rigid support member may be positioned between the compliant rib structures. In some of these embodiments, the rigid support member may be configured to contact and support the skin when the outer compliant contoured structure of the compliant rib structures is fully deformed.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 6 is a side view of a compliant rib structure applicable to both the configurations in FIG. 2 and FIG. 3;

FIG. 7 is a side view of an alternate embodiment of a compliant rib structure applicable to both the configurations in FIG. 2 and FIG. 3.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention address the need in the art by providing a compliant mechanism that is intentionally designed to be flexible to generate motion from a deformation of a body rather than from relative motion of links such as a conventional hinged mechanism. The deformation based design of compliant mechanisms usually makes compliant mechanism light weight, low power, no or minimal assembly and maintenance, no backlash, and longer life span compared to stiffness based multi-body designs. Compliant mechanisms incorporated in some embodiments of the invention encompass a compliant wing system that is configured to actively morph wing camber without discrete control surfaces such as flaps.

Figure 1:
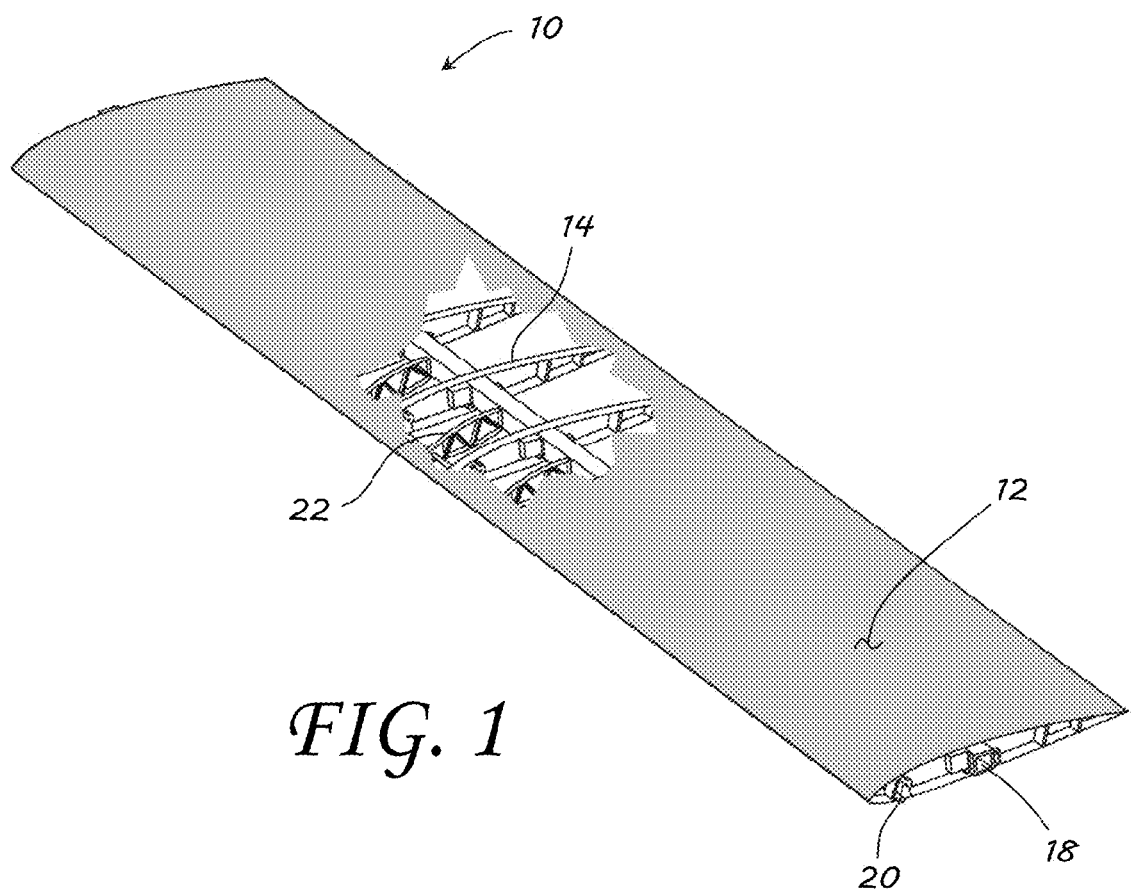
FIG. 1 is an exemplary configuration of a fixed compliant wing system consistent with embodiments of the invention.
Figure 4:
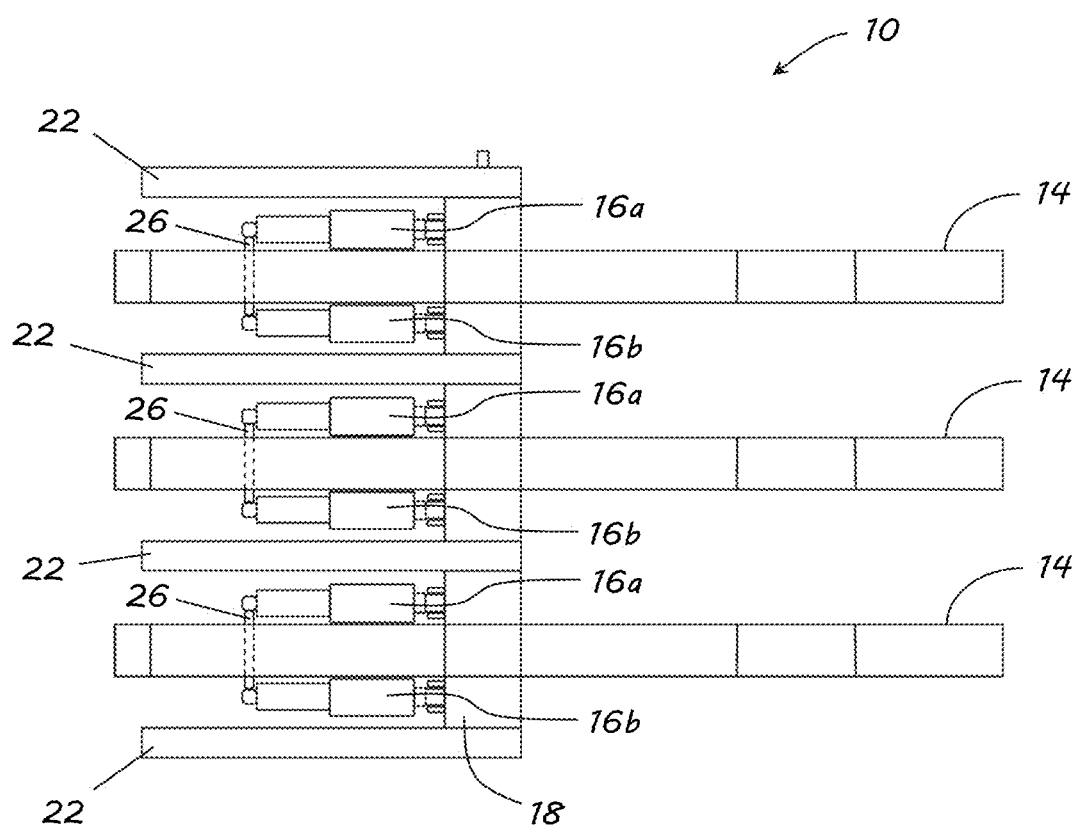
FIG. 4 is a portion of the internal configuration applicable to both the configuration in FIG. 2 and the configuration in FIG. 3.

Turning now to the drawings, FIG. 1 illustrates an exemplary embodiment of a fixed compliant wing system 10. The fixed compliant wing system 10 includes a skin 12, a plurality of compliant ribs 14, and a plurality of actuators 16 (FIG. 4) associated with each of the compliant ribs 14. The fixed compliant wing system is mounted on a rigid spar 18 and a rigid stopper 20, which would be coupled to an aircraft fuselage as is known in the art. Additional rigid support brackets 22 are coupled to the rigid spar 18 for additional support of the fixed compliant wing system 10 when the wing system 10 is in both deformed and undeformed configurations.

Figure 2:
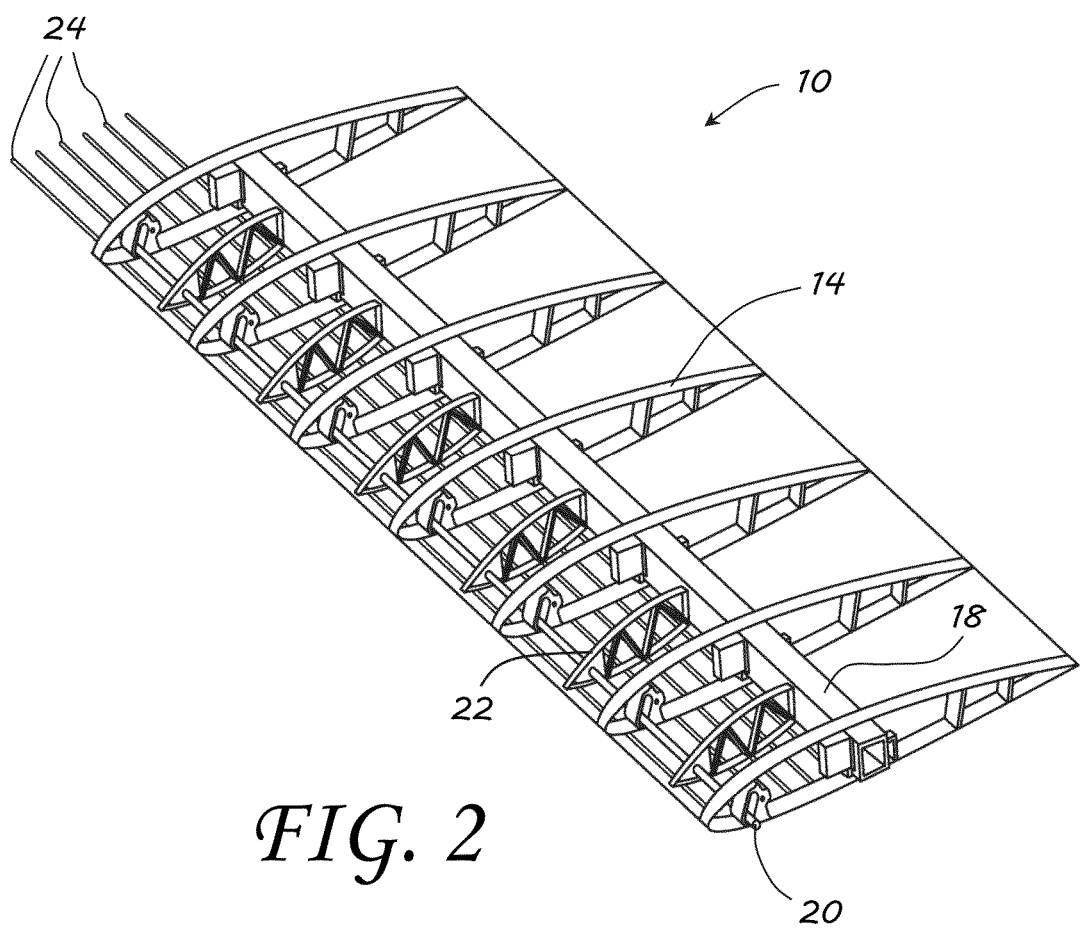
FIG. 2 is an alternate exemplary internal configuration of a fixed compliant wing system consistent with embodiments of the invention.

The wing skin 12, in some embodiments of the compliant wing system 10, is not required to be stretchable or required to slide over the compliant ribs 14 to change a camber of the compliant wing system 10 because bending of the compliant ribs 14 is the main deformation mode of the mechanism. This trait is desirable for manufacturing and energy perspectives because the attachment of the skin 12 is simplified and the bending of the skin with the compliant ribs requires less actuation energy than a skin that stretches. An additional benefit from this configuration is that skin 12 may be constructed from a truly single piece of homogeneous material such as a homogeneous metal sheet, glass fiber, composite material, or other thin bendable material. The skin 12 may also be used for added stability of compliant ribs 14 in the fixed compliant wing system 10. In other embodiments, as illustrated in FIG. 2, stringers 24 may also be attached to the compliant ribs 14 for additional stability of the fixed compliant wing system 10 and reduction of the skin 12 deformation.

Figure 3:
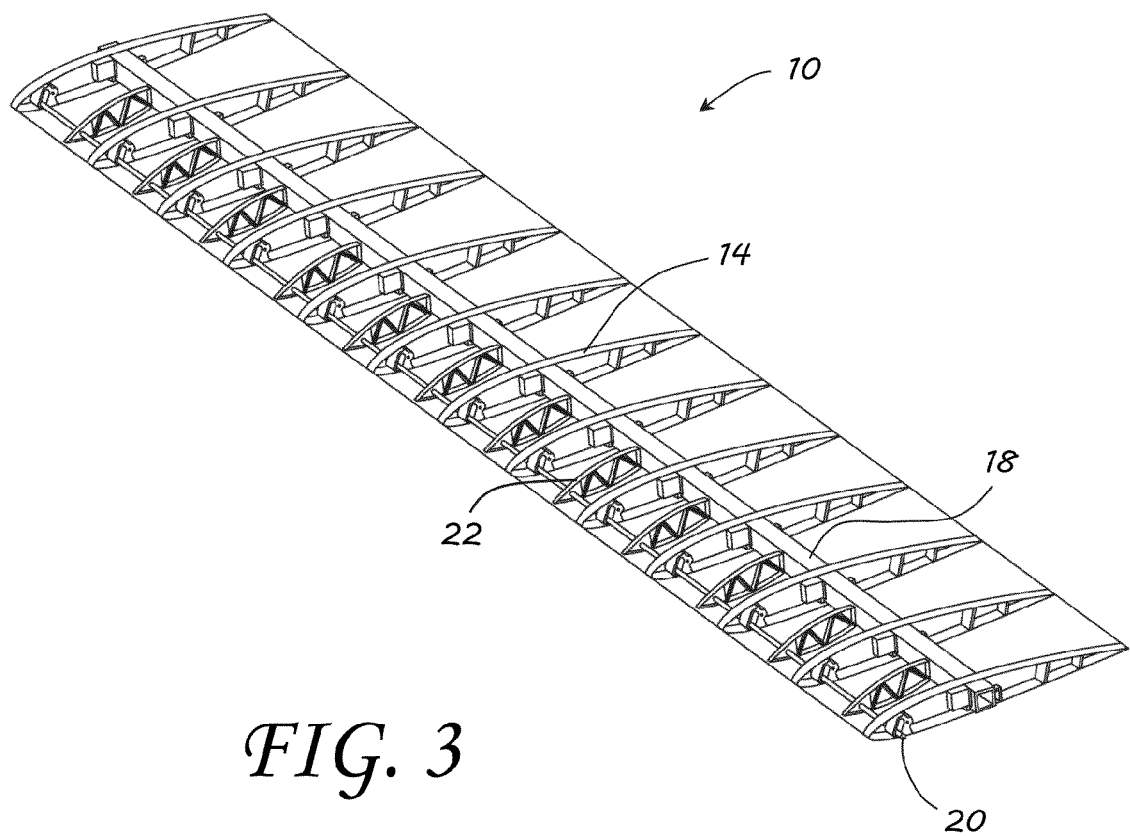
FIG. 3 is an internal configuration of the exemplary fixed compliant wing system of FIG. 1.

FIG. 3 illustrates an embodiment of the fixed compliant wing system 10 with an upper portion of the skin 12 removed to display an internal spacing of the compliant ribs 14 as well as the rigid spar 18, rigid stopper 20, and rigid support members 22. The number and spacing of the compliant ribs 14 will be dependent on the overall size of the compliant wing system 10. For example, in one specific embodiment, a span of the fixed compliant wing system 10 is approximately six feet. To meet the requirements for this exemplary compliant wing system 10, compliant ribs 14 were spaced approximately six inches apart with each compliant rib 14 having a two foot chord length. Other embodiments could have other numbers of ribs or rib spacings based on the length of the wing span as well as the size of the compliant ribs 14. Additionally, while the compliant ribs are illustrated to be approximately equally spaced in the exemplary embodiment in FIG. 3, other embodiments may utilize a nonuniform distribution of the compliant ribs 14, depending on the requirements of the fixed compliant wing system 10. Additionally, while the exemplary embodiment in FIG. 3 has a rigid bracket 22 positioned between each pair of compliant ribs 14, other embodiments may have more or fewer rigid brackets 22. And, in some of these embodiments, the bracket 22 may not be rigid, but rather also constructed of a compliant material.

The fixed compliant wing system 10 may be deformed utilizing a series of actuators 16. For uniform deformation of the compliant wing system 10, each compliant rib 14 may be deformed by being coupled to a single actuator 16 or other device that may apply a force or moment to the compliant rib 14 causing a deformation of the structure. In other embodiments, multiple compliant ribs may be directly connected together by a long pin or other connector and coupled by a pair of actuators at both ends for linear variation of the wing along the length of the wing. In still other embodiments, such as the exemplary embodiment illustrated in FIG. 4, each compliant rib 14 may be deformed by a pair of actuators 16a and 16b, for example. The actuators 16a, 16b may be coupled to a pin 26, which may further be coupled to a drive member 28 where the pin 26 is inserted through a hole 30. Utilizing a pair of actuators 16a, 16b to deform a single compliant rib 14 may assist in reducing a twist in the compliant rib 14. Additionally, each of the pairs of actuators 16a, 16b may be driven separately allowing for both uniform and nonuniform deformation of the fixed compliant wing system 10 along the length of the wing. Moreover, the nonuniform deformation may include a simple or more intricate wing twist, which is not possible in conventional flap type fixed wing systems or even some historical twisting wings. Driving of the actuators 16 in the fixed compliant wing system may be controlled via a controller (not shown) that may be in further communication with an aircraft control system.

Figure 5A:
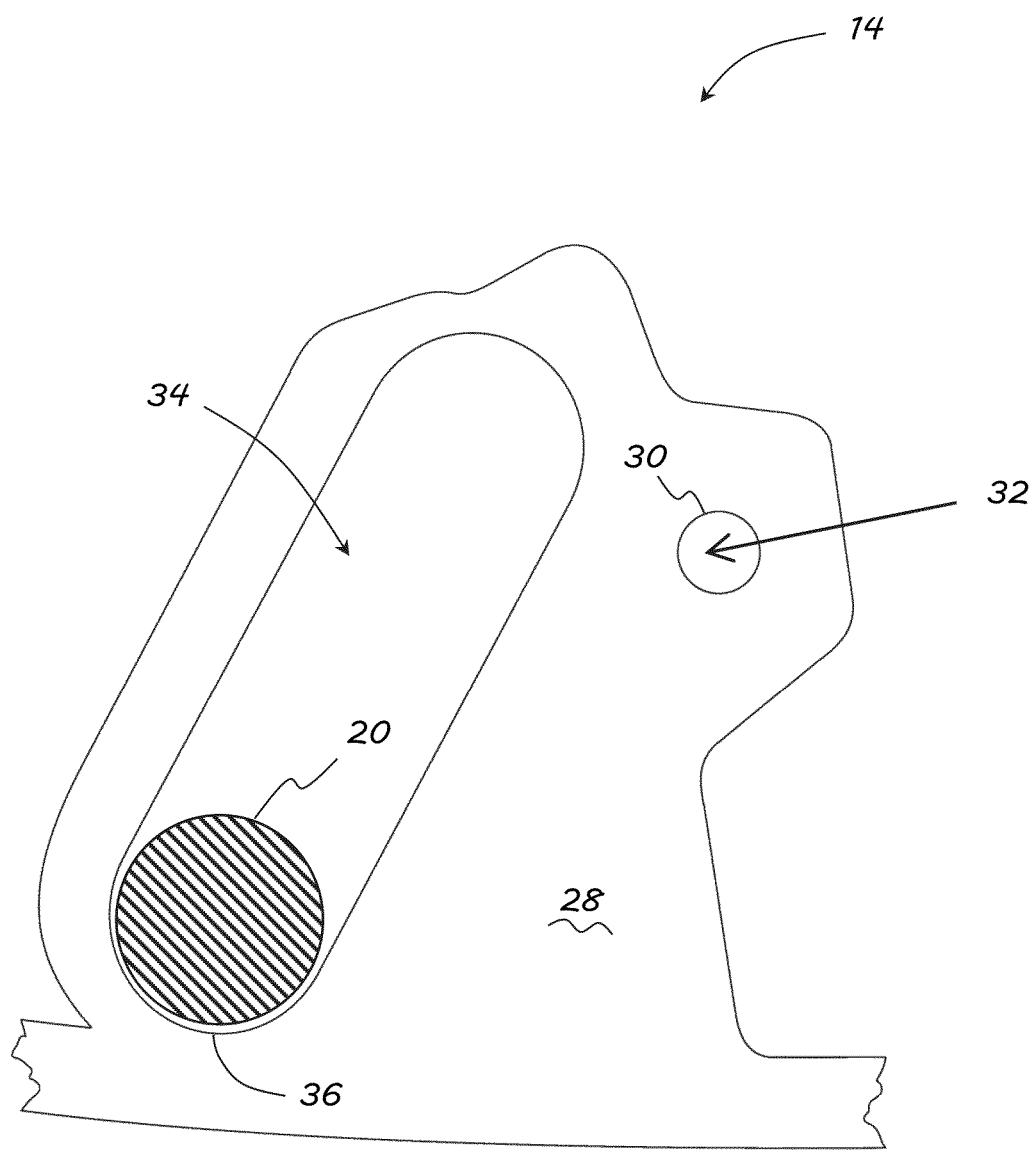
FIGS. 5A-5C are portions of an exemplary compliant rib structure from the internal configurations in FIG. 2 and FIG. 3.
Figure 5B:
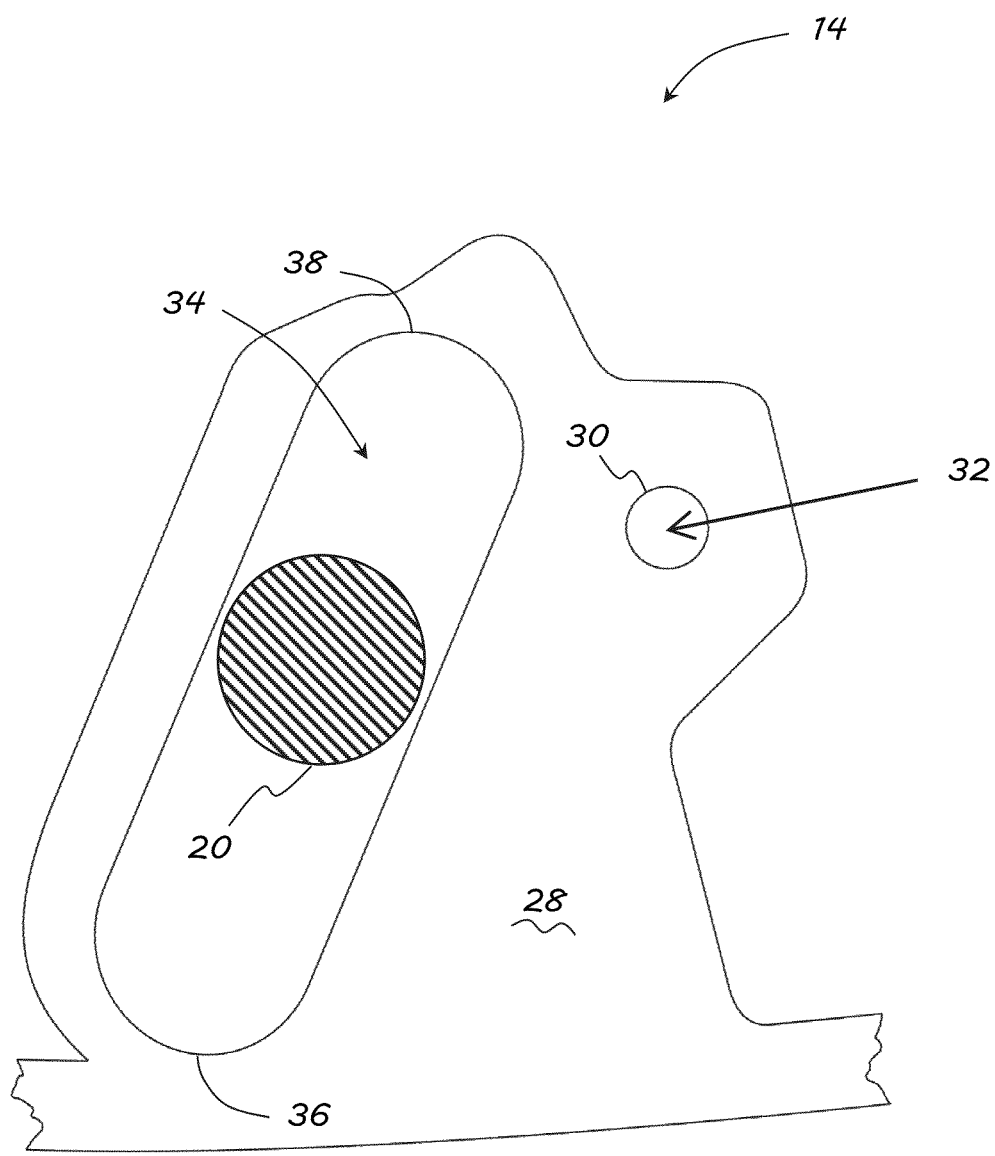
Figure 5C:
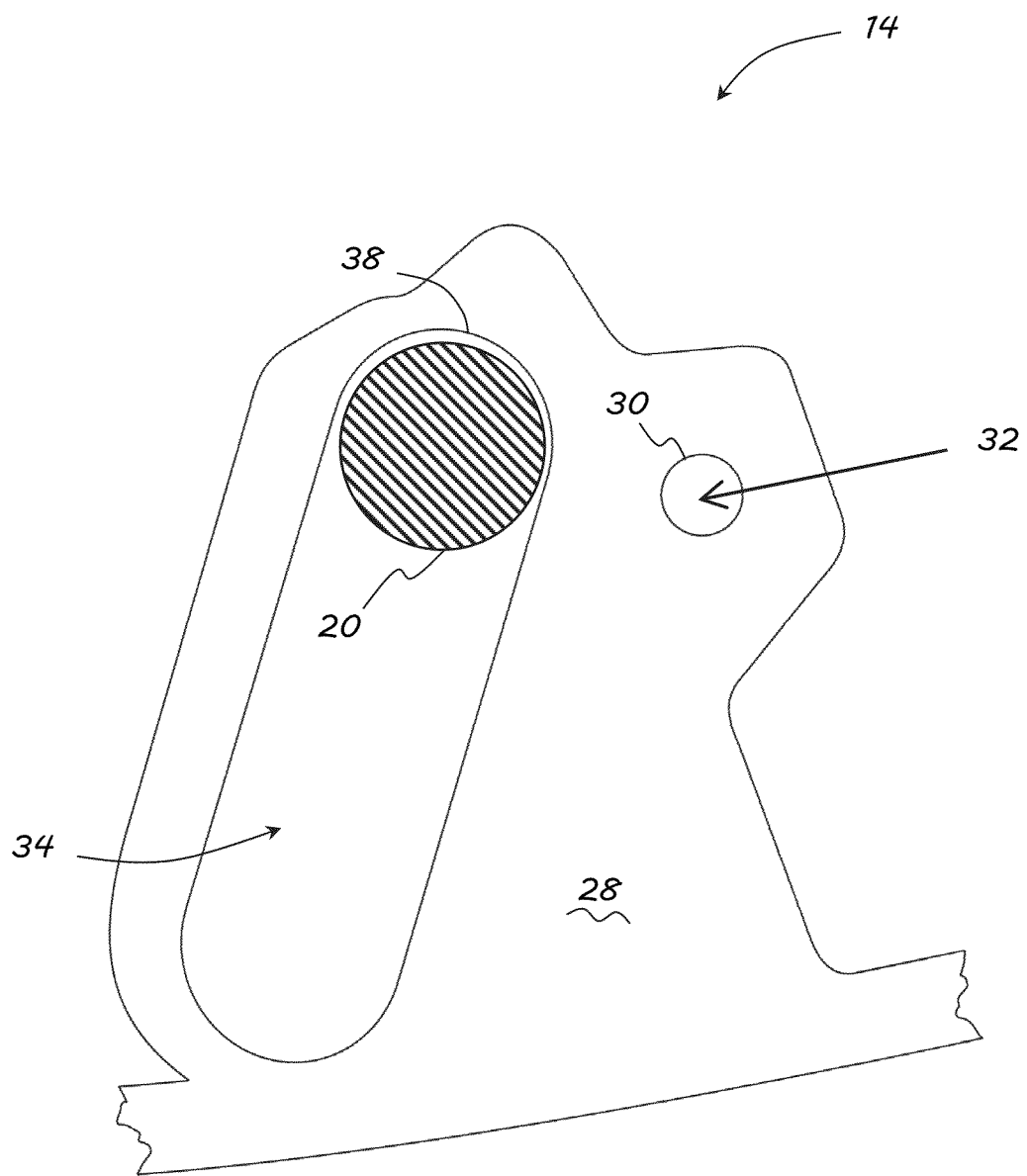

The actuators 16a, 16b displace pin 26, which in turn applies a force 32 to the drive member 28 through hole 30. As illustrated in FIGS. 5A through 5C, as force 32 is applied to the drive member 28 the drive member is pushed toward the rigid stopper 20. A guiding slot 34 encompassing the rigid stopper 20 is used to control the direction of the motion of the drive member 28, which in turn guides the deformation of the compliant rib 14. The guiding slot 34 may be straight, curved, or an arbitrary path depending on the deformed shape requirements. As force continues to be applied, the drive member 28 twists and slides along the rigid stopper 20 from a first end 36 of the guiding slot 34 until the rigid stopper 20 contacts a second end 38 of the guiding slot 34 (FIG. 5C). While the drive member 28 consists of the same compliant material as the rest of the compliant rib structure 14, the shape and location of the force application should be designed to minimize the deformation of the drive member itself. In other embodiments, the drive member 28 may be constructed of alternate materials with a greater stiffness than the material of the compliant rib 14 to further minimize the deformation of the drive member 28. The drive member 28 may return to the undeformed position (FIG. 5A) through either residual spring back from the stiffness of the compliant rib 14 or via a force applied in an opposing direction as the actuators 16a, 16b return to their original configuration.

Location of the drive member 28 on the compliant rib 14 will depend on the amount of deformation required by the structure and the actuator(s) 16 driving the system. Adjusting the location from the rigid spar 18 towards the leading edge of the wing structure 10 as illustrated in the exemplary embodiments in FIGS. 6 and 7, will change the amount of deformation possible by the actuators 16. Alternatively, in some embodiments, the drive member 28 may be positioned between the rigid spar and the trailing edge of the wing structure 10.

In the illustrated embodiment in FIG. 6, the compliant rib 14 attaches to a rectangular rigid spar 18 via a compliant support structure 40. The compliant support structure contains 40 a rectangular cavity 42 to match the shape of the rectangular rigid spar 18. The compliant support structure 40 may physically attach to the rigid spar 18 at any or all contact surfaces 44a-c of the rectangular cavity 42. In other embodiments, the rigid spar 18 may have other cross sections, which may be accommodated by a differently shaped cavity. The compliant support structure 40 is further coupled in at least one location to an outer compliant airfoil shaped structure 46 having a bottom portion 48 and a top portion 50. Other contoured shapes of the structure 46 may also be utilized in other embodiments. In the illustrated embodiment in FIG. 6, the compliant support structure 40 attaches at two locations 52a, 52b to the bottom portion 48 of the compliant airfoil shaped structure 46. In other embodiments, the compliant support structure 40 may attach at one or more locations to either or both of the top portion 50 and bottom portion 48 of the compliant airfoil shaped structure 46.

Additional support members connecting the top portion 50 and bottom portion 48 of the compliant airfoil shaped structure 46 may be added for additional stiffness. For example, as seen in the exemplary embodiment of FIG. 6, two support members 54, 56 are used to increase stiffness and adjust the amount of deformation at a trailing edge 58 of the compliant rib 14. In other embodiments, more or fewer support members may be used. Distribution of these support members may also vary based on the stiffness and deformation requirements of the fixed compliant wing system 10.

The exemplary compliant rib 14 in FIG. 6 includes a small gap 60 at the leading edge 62 of the compliant rib 14. In this embodiment, stringers may be placed in gaps 64 and 66 to assist in stiffening the open structure and assist in matching a target leading edge contour. Additionally, a mechanical spring 68 may be used to adjust the stiffness of the leading edge 62 of the compliant rib 14 to maintain a desired shape as the compliant rib 14 is deformed. Alternately, and as illustrated in FIG. 7, the leading edge 62 may be closed to reduce complexity and the need for an additional mechanical spring 68. Though, in some of these embodiments, a mechanical spring 68 may still be used to adjust the stiffness and ultimately the shape of the leading edge 62 of the compliant rib 14. The mechanical spring 68 may be replaced in either of the illustrated embodiments with an integrated compliant spring or other stiffness member.

The compliant ribs 14 in FIGS. 6 and 7 may be constructed of any compliant material that also provides an adequate stiffness for the overall fixed compliant wing system 10. In some embodiments, the ribs may consist of an ABS plastic material or a Urethane. In still other embodiments, the ribs may consist of a three dimensional printing material SOMOS® NeXt. Other embodiments may consist of other types of compliant materials as well. Additionally, some embodiments may consist of multiple materials to assist in adjusting the stiffness of the structure to obtain the desired deformations.

Figure 8:
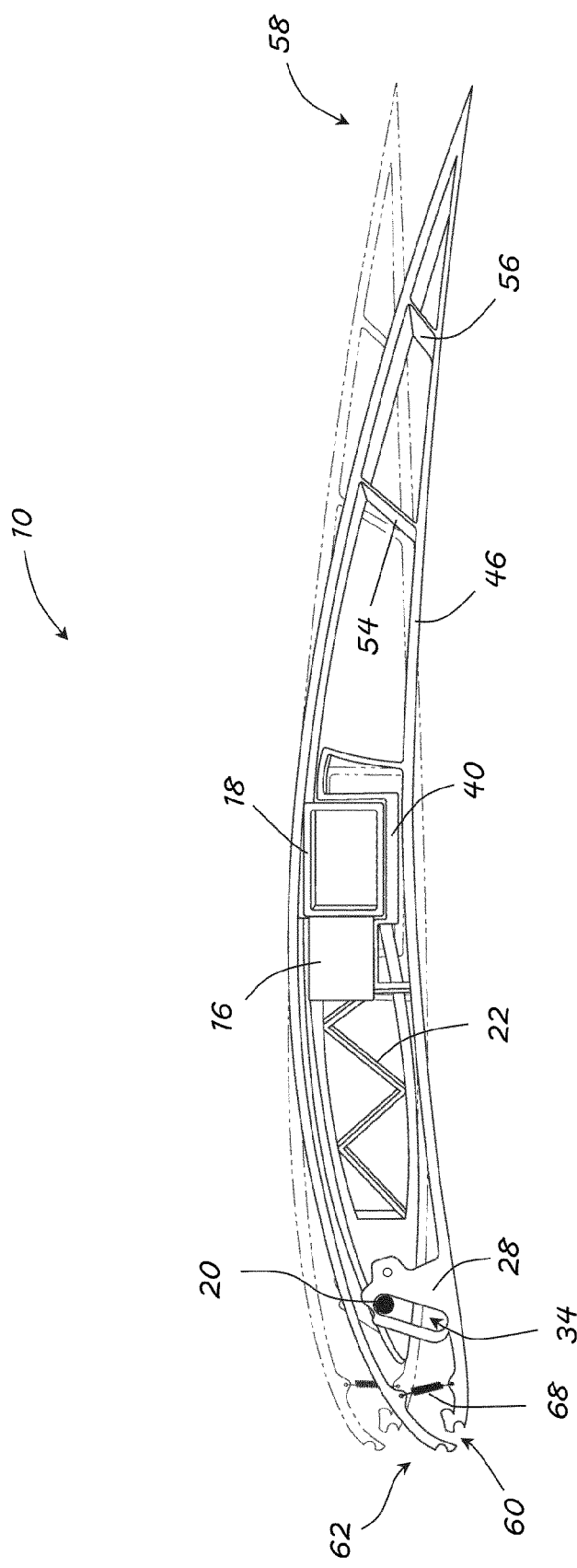
FIG. 8 is a side view of the exemplary configuration in FIG. 1 in a deformed state.

Turning finally to FIG. 8, this figure illustrates a compliant rib 14 in a fully deformed shape superimposed over an undeformed rib 14. As can be seen in the figure, the application of force to the drive member 28 toward the leading edge 62 of the compliant rib 14 results in a deformation at both the leading 62 and trailing 58 edges. In the illustrated embodiment of FIG. 8, a camber change of approximately six percent may be achieved. Other embodiments with other configurations may achieve camber changes greater or less than approximately six percent.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art, for example while the illustrated embodiments were all related to a fixed aircraft wing, the compliant wing system set out above has applications anywhere an airfoil is used, e.g. automobiles, watercraft, etc. The invention in its broader aspects is therefore not limited to the specific details, representative apparatus and method, and illustrative examples shown and described. Accordingly, departures may be made from such details without departing from the scope of the general inventive concept.

What is claimed is:

1. A fixed compliant wing system coupled to a rigid spar and a rigid stopper, the fixed compliant wing system comprising:
    an actuator coupled to the rigid spar;
    at least two compliant rib structures coupled to the rigid spar and having a leading edge and a trailing edge, the compliant rib structures including:
        an outer compliant contoured structure having a top portion and a bottom portion;
        a drive member coupled to the outer compliant contoured structure;
        the drive member in a sliding arrangement with the rigid stopper;
        the drive member further connected to the actuator;
        a support member having a first end and a second end;
        the first end of the support member coupled to the bottom portion of the outer compliant contoured structure; and
        the second end of the support member coupled to the top portion of the outer compliant contoured structure,
        wherein the outer compliant contoured structure is configured to deform when force is applied from the actuator to the drive member by the actuator causing the drive member to slide from a first position with respect to the rigid stopper to a second position with respect to the rigid stopper;
    a skin encompassing the at least two compliant rib structures; and
    a compliant support structure rigidly coupled to the rigid spar,
    wherein the compliant support structure is coupled to the outer compliant contoured structure, and
    wherein the compliant support structure is positioned between the leading edge and the trailing edge of the compliant rib structures.

2. The fixed compliant wing system of claim 1, wherein the support member is positioned between the compliant support structure and the trailing edge of the compliant rib structures.

3. The fixed compliant wing system of claim 1, wherein the drive member is positioned between the leading edge of the compliant rib structures and the compliant support structure.

4. A compliant rib structure for use in a compliant system, the compliant rib structure comprising:
    an outer compliant contoured structure having a top portion and a bottom portion;
    the compliant rib structure having a leading edge and a trailing edge;
    a drive member coupled to the outer compliant contoured structure;
    the drive member configured to be in a sliding arrangement with a rigid stopper;
    the drive member further configured to be connected to an actuator; and
    a compliant support structure configured to be rigidly coupled to a rigid spar,
    wherein the compliant support structure is coupled to the outer compliant contoured structure,
    wherein the compliant support structure is positioned between the leading edge and the trailing edge of the compliant rib structures, and wherein the outer compliant contoured structure is configured to deform when force is applied to the drive member.

5. The compliant rib structure of claim 4, wherein the support member is positioned between the compliant support structure and the trailing edge of the compliant rib structures.

6. The compliant rib structure of claim 4, wherein the drive member is positioned between the leading edge of the compliant rib structures and the compliant support structure.

* * * * *